United States Patent [19]

Wakasugi

[11] 4,228,502
[45] Oct. 14, 1980

[54] ELECTRONIC COMPUTER SYSTEM

[75] Inventor: Yasuhito Wakasugi, Owariasahi, Japan

[73] Assignee: Hitachi, Ltd., Japan

[21] Appl. No.: 919,313

[22] Filed: Jun. 26, 1978

[30] Foreign Application Priority Data

Jun. 29, 1977 [JP] Japan ................................. 52-76527
Jun. 29, 1977 [JP] Japan ................................. 52-76528

[51] Int. Cl.² .............................................. G06F 3/00
[52] U.S. Cl. .................................................. 364/200
[58] Field of Search ............... 364/200, 900, 700, 709, 364/715, 200 MS File, 900 MS File

[56] References Cited

U.S. PATENT DOCUMENTS

| | | | |
|---|---|---|---|
| 3,470,538 | 9/1969 | Harbaugh | 445/1 |
| 3,786,433 | 1/1974 | Notley et al. | 364/200 |
| 3,860,914 | 1/1975 | Zitelli et al. | 364/900 |
| 4,030,073 | 6/1977 | Armstrong, Jr. | 364/900 |
| 4,051,326 | 9/1977 | Badagliani et al. | 364/900 |
| 4,103,330 | 7/1978 | Thacker | 364/200 |

Primary Examiner—Gareth D. Shaw
Assistant Examiner—C. T. Bartz
Attorney, Agent, or Firm—Craig & Antonelli

[57] ABSTRACT

In an electronic computer system which automatically carries out initial program loading in response to an externally given signal such as a power-on signal, a system reset signal, etc., the initial program loading is not always carried out in response to the externally given signal but a higher priority request, if any, is first executed.

2 Claims, 4 Drawing Figures

ELECTRONIC COMPUTER SYSTEM

BACKGROUND OF THE INVENTION

1. Field of the Invention

In an electronic computer system, a program is usually read out of an external memory prior to the initiation of data processing and it is stored in a main memory. This operation is known as initial program loading. The present invention relates to an electronic computer system and in particular to such initial program loading.

2. Description of the Prior Art

In a conventional electronic computer system, it is necessary to carry out a particular keying operation in order to load an initial program. In order to eliminate the troublesome keying operation, it has been proposed to automatically carry out the initial program loading in response to an externally given signal, such as a power-on signal, a system reset signal, etc., which signal starts the initial program loading. In this case, however, while the operability is enhanced by the automation of processing, the initial program loading occurs in any case, even in a case where the initial program loading is not to be carried out but other processing should be carried out instead.

SUMMARY OF THE INVENTION

In order to overcome the above problem encountered in the prior art system, it is an object of the present invention to provide an initial program loading system which enables the designation of a special operation while retaining the capability to subsequently perform automatic start of initial program loading.

According to the present invention, in an electronic computer system which automatically carries out an initial program loading in response to an externally given signal, such as a power-on signal, a system reset signal, etc., there are provided means for inhibiting the initial program loading which otherwise would be carried out in response to power-on or system reset, and means for designating another operation to be carried out in place of the initial program loading. The means for inhibiting the initial program loading may be constructed to be preset prior to a command an operation such as power-on or system reset, or the like. Alternatively, it may be constructed such that the initial program loading is carried out unless the operation to be carried out in place of the initial program loading is designated by said designation means within a predetermined time period after the power-on or system reset or the like.

In accordance with the present invention, in a system which requires an initial program loading at the time of power-on or system reset, the high operability by the automatic start of the initial program loading can be maintained in the usual case, and another operation can be designated in a special case.

DESCRIPTION OF PREFERRED EMBODIMENTS

Figure 1:
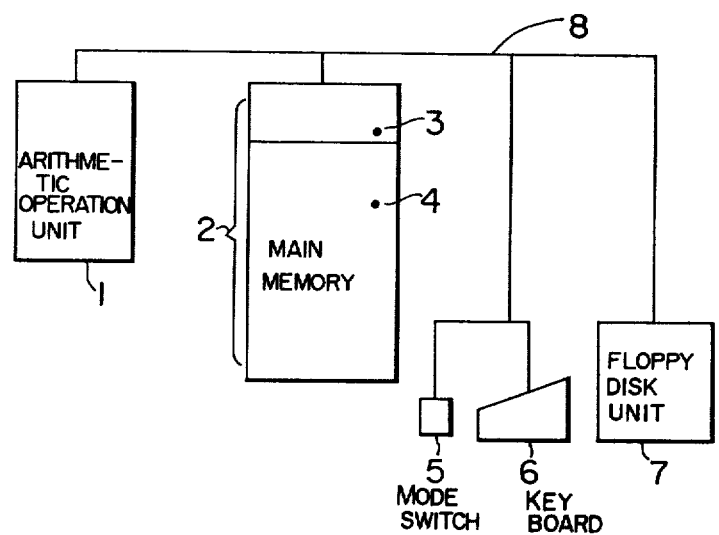
FIG. 1 is a block diagram showing an embodiment of the present invention.

Referring to FIG. 1, connected to an arithmetic operation unit 1 are a main memory 2, a mode switch 5, a keyboard device 6 for a system console and a floppy disk unit 7, through an interface bus line 8. The main memory 2 has an area 3 which prestores a program for executing the initial program loading and an area 4 in which a program is stored by the initial program loading. The mode switch 5 functons to switch a mode of the system between manual mode and auto-mode and it may be included in the keyboard device 6.

In the arrangement described above, when the mode switch 5 is at the auto-mode position, the initial program loading is automatically carried out in response to the key-in for the power-on system reset. In the initial program loading, a program is read out of the floppy disk unit 7 and it is stored in the area 4 in the main memory 2.

When the mode switch 5 is at the manual mode position, on the other hand, the initial program loading is not carried out even if the power-on or system reset is keyed in but the selection of the subsequent operation is under the control of an operator. Consequently, processing designated by the keyboard device 6 is carried out. An example of such processing is memory damping, in which a contents of the main memory 2 is read to an output device. That is, when an error occurs in the system causing system "down" and a cause thereof is not known to an operator, the operator sets the mode switch 5 to the manual mode and keys in the system reset and then keys in a command of memory damping by the keyboard device 6. As a result, the content of the main memory 2 is read to the output device so that the content can be analized to determine the cause of the error.

If the system reset is carried out in the auto-mode, the initial program loading is carried out and the content of the main memory 2 is updated.

Figure 3:
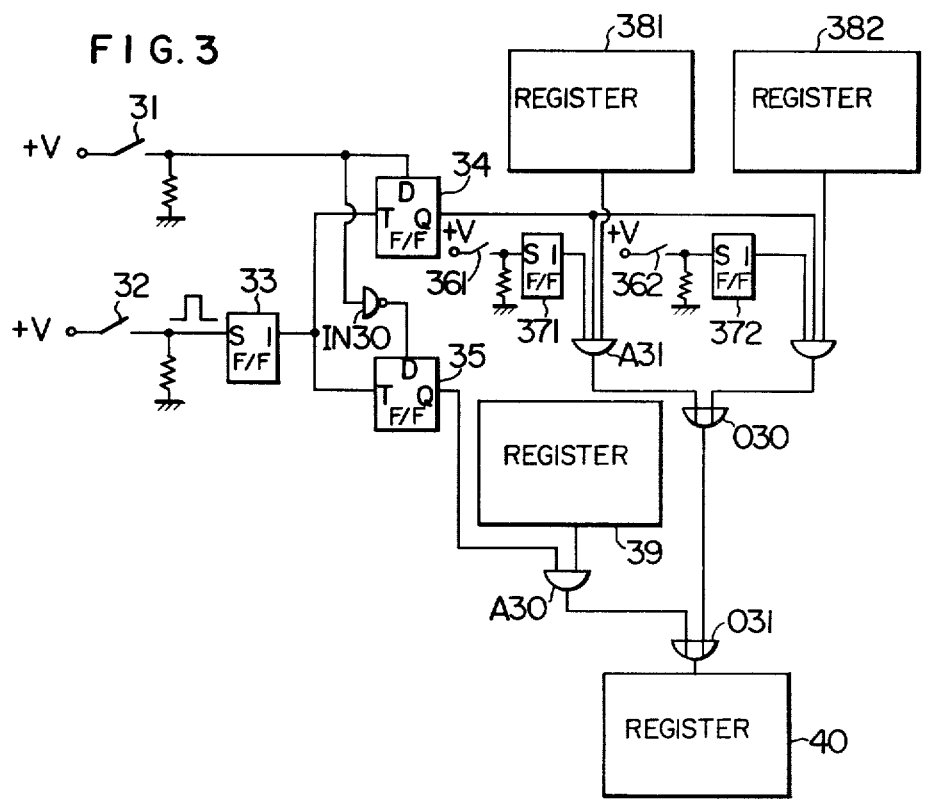
FIGS. 3 and 4 are circuit diagrams illustrating details of portions of FIGS. 1 and 2, respectively.

FIG. 3 is a circuit diagram which shows a major portion of FIG. 1 in detail. In FIG. 3, numeral 31 denotes a mode switch, which sets the auto-mode at the illustrated off-position and sets the manual mode at the opposite onportion. Numeral 32 denotes a switch which is operatively linked to a power-on switch (not shown) or system reset switch (not shown) so that it is turned on only for a predetermined time period when the power-on switch or system reset switch is turned on. Numerals 33 and 35 denote flip-flops, of which the flip-flops 34 and 35 are triggerable flip-flops. Numerals 361 and 362 denote switches for designating other operations to be carried out in place of the initial program loading, numerals 371 and 372 denote flip-flops which are reset by the actuation of the switches 361 and 362, respectively, numerals 381 and 382 denote registers, in which leading addresses of programs for executing the other operations are stored, numeral 39 denotes a register in which a leading address of a program for executing the initial program loading is stored, and numeral 40 denotes a register to which an address for reading a command in the main memory is set.

In the circuit of FIG. 3, when the mode switch 31 is turned off, that is, set to the auto-mode, the switch 32 is actuated in response to the power-on or system reset and the flop-flop 33 is set, while the flip-flop 35 is set because the output of an inverter IN30 is HIGH. Thus, an AND gate A30 is opened so that the content of the register 39 is sent to the register 40 through an OR gate 031 to initiate the initial program loading.

When the mode switch 31 is turned on, on the other hand, that is, set to the manual mode, and the switch 361 for designating memory damping is turned on, the switch 32 is actuated in response to the power-on or system reset and the flip-flop 33 is set, while the flip-flop 34 is set because the output of the switch 32 is HIGH. Thus, an AND gate A31 which is associated with the on-state switch 361 is opened so that the content of the register 381 is sent to the register 40 through the OR gates 030 and 031 to initiate memory damping.

Figure 2:
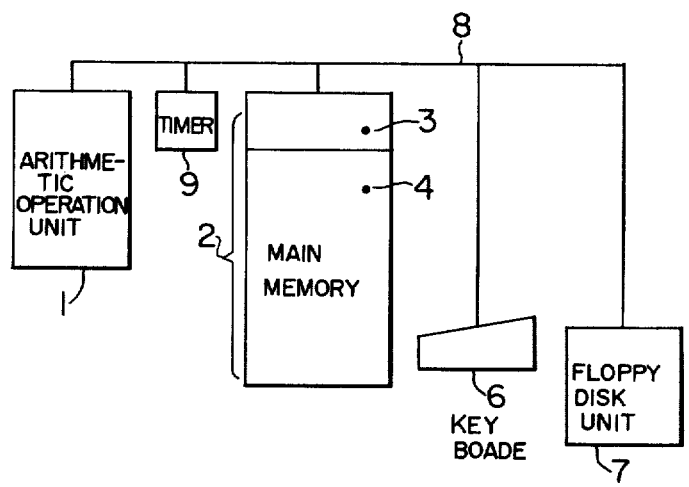
FIG. 2 is a block diagram showing another embodiment of the present invention.

FIG. 2 shows another embodiment of the present invention, which differs from that of FIG. 1 in that a timer mechanism 9 is connected to the interface base line 8.

In the above arrangement, when the power-on or system reset is keyed in, the timer mechanism 9 first starts to operate. The timer mechanism 9 counts a time and if the keyboard device 6 does not designate any operation within three seconds, for example, the program is read from the floppy disk device 7 and it is stored in the area 4 of the main memory 2. Thus, the initial program loading is completed. If any processing is designated by the keyboard 6 within the three seconds, the initial program loading is not carried out but the designated processing is carried out. An example of such processing is memory damping, like in the previous embodiment. If an operator keys the keyboard device 6 to designate memory damping immediately within three seconds, for example, after the operator has keyed in the system reset, the content of the main memory 2 is read to the ouput device and data thereof is analized to determine the cause of error. If none is keyed in after the system reset, the initial program loading is carried out and the content of the main memory 2 is updated.

Figure 4:
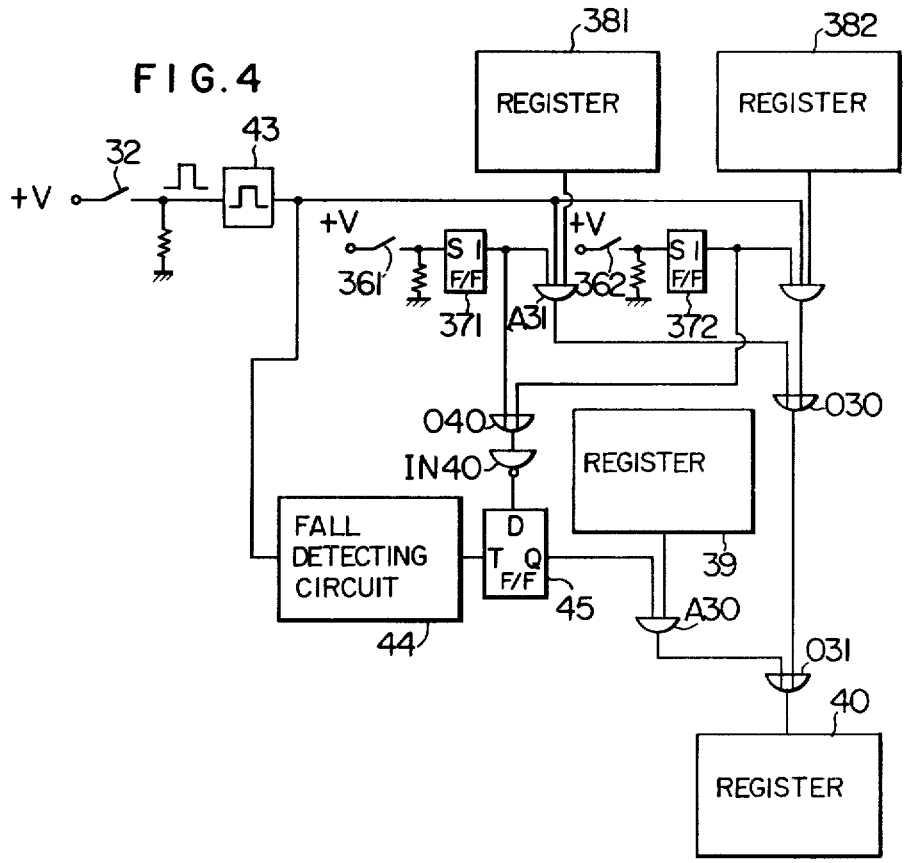

FIG. 4 is a circuit diagram illustrating a major portion of FIG. 2 in detail. In FIG. 4, numeral 43 denotes a timer circuit which produces an output for a predetermined time period. Numeral 44 denotes a fall detecting circuit, and numeral 45 denotes a triggerable flip-flop. Numerals 32, 361, 362, 371, 372, 381, 382, 39, 40, 030, 031, A30 A31 denote like parts to those shown in FIG. 3.

In the circuit described above, the switch 32 is actuated in response to the power-on or system reset so that the timer circuit 43 is set. Assuming that the switches 361 and 362 are both in turned-off position, the output of the inverter IN40 through the OR gate 040 is HIGH and the triggerable flip-flop 45 is set at the fall of the output of the timer circuit 43. Thus, the AND gate A30 is opened and the content of the register 39 is sent to the register 40 through the OR gate 031 so that the initial program loading is started.

If the switch 361, for example, is turned on after the timer circuit 43 is set, the AND gate A31 associated thereto is opened so that the content of the register 381 is sent to the register 40 through the OR gates 030 and 031. Thus, the memory damping is initiated.

I claim:

1. In an electronic computer system which automatically carries out initial program loading in response to an externally given signal, an improvement comprising means for inhibiting the initial program loading which would otherwise be carried out in response to said externally given signal, and means for designating an alternative operation to be carried out in place of said initial program loading in response to said externally given signal, said initial program loading inhibiting means being constructed such that it permits the initial program loading to be achieved when said alternative operation designating means does not designate the alternative operation in a predetermined time period after the application of said externally given signal.

2. An electric computer system according to claim 1, wherein said initial program loading inhibiting means is constructed such that it can be preset by an operator prior to the application of said externally given signal.

* * * * *